United States Patent [19]

Ichikawa et al.

[11] Patent Number: 4,985,623
[45] Date of Patent: Jan. 15, 1991

[54] DIFFRACTION-TYPE OPTICAL ENCODER WITH IMPROVED DETECTION SIGNAL INSENSITIVITY TO OPTICAL GRATING GAP VARIATIONS

[75] Inventors: Souji Ichikawa, Sagahihara; Hideki Oka, Kawasaki; Naoyoshi Terao, Urawa; Seiji Sakagami, Kawasaki, all of Japan

[73] Assignee: Mitytoyo Corporation, Tokyo, Japan

[21] Appl. No.: 490,389

[22] Filed: Mar. 8, 1990

Related U.S. Application Data

[62] Division of Ser. No. 298,430, Jan. 18, 1989, abandoned.

[30] Foreign Application Priority Data

Jan. 22, 1988 [JP] Japan .................................. 63-12143
Jan. 25, 1988 [JP] Japan .................................. 63-42626

[51] Int. Cl.$^5$ .............................................. G01D 5/34
[52] U.S. Cl. ........................ 250/231.16; 250/237 G
[58] Field of Search ................... 250/231.16, 231.14, 250/231.13, 237 G; 356/395, 375; 33/707

[56] References Cited

U.S. PATENT DOCUMENTS

3,768,911 10/1973 Erickson .............................. 356/374
3,833,807 9/1974 Takeda ............................ 250/237 G
4,529,964 7/1985 Minami et al. ....................... 341/13

Primary Examiner—David C. Nelms
Attorney, Agent, or Firm—Oliff & Berridge

[57] ABSTRACT

In an optical encoder using a collimated lighting system, an index scale is inclined toward a main scale by a predetermined value. With this arrangement, a component of variation in the detection signal due to variations in the grating gap can be offset or integrated to be removed from a geometric image of the first grating in the detection signal, whereby the dependence of an S/N ratio of the detection signal on the grating gap can be avoided.

3 Claims, 12 Drawing Sheets $Q = P/(2n)$

DIFFRACTION-TYPE OPTICAL ENCODER WITH IMPROVED DETECTION SIGNAL INSENSITIVITY TO OPTICAL GRATING GAP VARIATIONS

This is a division of application Ser. No. 07/298,430 filed Jan. 18, 1989 now abandoned.

BACKGROUND OF THE INVENTION

1. Field of the Invention

The present invention relates to diffraction type optical displacement encoders. More particularly, the present invention relates to improvements in an optical displacement encoder for detecting a positional relationship between two members from a change in a photoelectrically transduced signal caused by a relative displacement between a main scale formed thereon with an optical grating and an index scale formed thereon with an optical grating corresponding to that of the main scale.

2. Description of the Prior Art

In the field of measuring a feed rate and the like of a tool in a machine tool, there is widely used an optical encoder wherein a main scale formed with a first grating is affixed onto one of opposing members, an index scale formed with a second grating, a lighting system including a light source and a light-receiving element are affixed onto the other, and a detection signal that varies periodically in accordance with a relative movement between the opposing members is produced.

The conventional diffraction-type optical displacement encoder uses a collimated lighting system in general, whereby the first grating and the second grating are equal in pitch.

In contrast thereto, there has heretofore been proposed a diffraction-type displacement encoder wherein the pitch of the second grating is 1/n (n is a natural member) of the pitch of the first grating, as shown for example, in Japanese Patent Application No. 61-191532.

Such an optical encoder having an even number n pitch grating, as depicted in FIG. 11, mainly comprises: a collimated lighting system 10 including a light-emitting diode (LED) 12 having an effective wave length $\lambda$, a collimator lens 14, a main scale 16 formed with a first grating 18 of a pitch P, an index scale 20 spaced V (gap) apart from the first grating 18 and formed with a second grating 22 of a pitch $Q = P/(2n)$ (n is a natural number), a light-receiving element 24 for photoelectrically transducing a light emitted from the collimated lighting system 10 and filtered through the first and the second gratings 18 and 22, and a preamplifier 26 for amplifying a output signal therefrom to obtain a detection signal(a).

A S/N ratio of the detection signal (a) is normally represented by a ratio of PP/DC between an amplitude PP and a DC component DC. An example of the experimental result in a case of a pitch $Q = P/2$ and, when a grating gap (V) is varied, is indicated by a solid line A in FIG. 12.

Since the S/N ratio (=PP/DC) of the detection signal (a) is fluctuated by the grating gap (V) as apparent from FIG. 12, if the index scale 20 is fixed at a position where PP/DC is at the minimum at the time of assembling the encoder, then the S/N ratio of the detection signal (a) is lowered so that its resistance to noise is diminished. This presents a problem in that the positioning accuracy becomes severely critical and the encoder is thus increased in cost.

Diffraction optical displacement encoders are typically of either the transmission type or the reflection type. The former, as shown in FIG. 11, detects light transmitted through the main scale 16, whereas the latter or reflection type detects light reflected by the main scale. In the reflection type, a light emitting element and light-receiving element are provided on the same side with respect to the main scale so as to facilitate its assembly and use in machine tool devices or systems.

FIG. 15 shows an example of the reflection type encoder the conventional collimated lighting rays and comprises: an emitting diode 12 as being the light source, a collimator lens 14, a main scale 16 formed with a periodical first grating 18, a light-transmitting index scale 20 formed with a periodical second grating 22 corresponding to the first grating 18 of the main scale 16 and is movable relative to the main scale 16, and a light-receiving element 24 for photoelectrically/transducing reflected rays R from the collimated lighting system. Rays R are reflected by the first grating 18 of the main scale 16 and transmitted through the second grating 22 of the index scale 20, whereby a periodical detection signal is thereby produced in accordance with a relative displacement between the main scale 16 and the index scale 20.

However, the use of the collimated lighting rays requires a large collimating lens 14 having high accuracy, whereby the encoder becomes large-sized in a thickness direction (D), and suffers from the additional problems that methods of affixing and positioning the elements are difficult to perform.

A solution to this problem has heretofore been proposed, for example in applicant's Japanese Patent Application No. 61-194183, in which a diffusive light source is used as depicted in FIG. 16.

This reflection type encoder comprises: a laser diode (LD) tip 34 as being the diffusive light source (a point light source), a main scale 16 formed with the periodical first grating 18, a light-transmitting index scale 20 formed with the periodical second grating 22 corresponding to the first grating 18 of the main scale 16, and a light-receiving element 24 for photoelectrically transducing light reflected from the first grating 18 of the main scale 16 and transmitted through the second grating 22 of the index scale 20, whereby a periodical detection signal is thus produced in accordance with a relative displacement in a direction X between the main scale 16 and the index scale 20.

Moreover the LD tip 34 is typically housed in a container 32 provided with a monitor light-receiving element for example.

Distances between the LD tip 34 and the first grating 18 and between the second grating 22 and the first grating 18 are set at u and V, respectively, and pitches of the first grating 18 and the second grating 22 are set at P and Q, respectively. Further, when the most practical arrangement of $u = V$ is adopted (as proposed in Japanese Patent Application No. 61-194183) and if $Q = 2P$ (adopted for example from the similarity), then a detection signal having a satisfactory S/N ratio can be obtained.

Further, in a coherent case where the point light source (LD tip 34) has a coherence, even under $Q = P$, a detection signal can be obtained due to the diffraction effect (as proposed in Japanese Patent Application No. 61-194184).

Additionally, it is also clear that when under $Q = 2P/m$ (m is a natural number), a detection signal is generally obtainable as discussed in Japanese Patent Application Nos. 61-208554 and 61-208555 which were also proposed by the present applicant.

As described above, the reflection type encoder, in which the point light source (34) is used as it is, is effective in rendering the encoder small-sized in the thickness direction (D).

However, in the use of the laser diode, although the LD tip 34 itself is small in size, the container 32 for the LD tip 34 is relatively large considering the amount of radiant heat and the like. More particularly, when the arrangement of $u = V$, it is difficult to place the light source and the light-receiving element 24 close to each other, and, moreover, the encoder cannot be made very small in size in a direction parallel to a plane where the graduation (the first grating 18) of the main scale 16 is formed.

Furthermore, it is necessary to support the point light source obliquely, and normally, it is necessary to provide a plurality of pairs of second gratings 22 and light-receiving elements 24 in association with phases of 0°, 90°, 180°, 270°, etc. of the detection signal However, the encoder of this type suffered from the problem that methods of arranging and supporting the above members are difficult to perform.

SUMMARY OF THE INVENTION

The present invention has been developed to obviate the above-described disadvantages of the related art and has as its first object the provision of a diffraction-type optical displacement encoder in which the dependence of the S/N ratio of the detection signal on the grating gap is lower than that in the past.

It is a second object of the present invention to provide a reflection type displacement encoder having an arrangement in which the encoder can be rendered small in size not only in a thickness direction but also in a direction parallel to a plane where the graduation of the main scale is formed.

To achieve the first object, according to a first aspect of the present invention, in an optical encoder comprising:

a coherent diffusive light source having an effective wave length $\lambda$, a main scale provided at a position spaced u apart from the diffusive light source and formed with a first grating of a pitch P, an index scale provided at a position spaced V apart from the first grating and formed with a second grating and a light-receiving element for photoelectrically transducing the light emitted from the diffusive light source and filtered through the first and second gratings, wherein a detection signal periodically variable in accordance with a relative displacement between the main scale and the index scale is produced, the light-receiving element is adapted to receive two rays satisfying the relationship between the following equations in order to remove a component of fluctuations due to the grating gap (V) of a geometric image of the first grating in the detection signal:

$$u_2 V_2 / (u_2 + V_2) - u_1 V_1 / (u_1 + V_1) \approx m P_2 / \lambda \quad (1)$$

and $$W \approx n[(u_2 + V_2) \sin\theta_2 - (u_1 + V_1) \sin\theta_1] \quad (2)$$

where m and n are integers, $u_1$ and $u_2$ are lengths of light paths of the rays between the diffusive light source and the first grating, $V_1$ and $V_2$ are lengths of light paths of the rays between the first and second gratings, W is a center interval between the rays on the second grating, and $\theta_1$ and $\theta_2$ are angles made by a perpendicular line drawn from the diffusive light source to the gratings with the rays.

Furthermore, to achieve the first object according to the first aspect of the present invention, in an optical diffraction-type displacement encoder similar to the above, two of the above-described light-receiving elements are provided and the respective light-receiving elements are adapted to receive two rays satisfying the relationship between the following equations, and a sum of the outputs from the respective light-receiving elements is made to be the detection signal:

$$u_2 V_2 / (u_2 + V_2) - u_1 V_1 / (u_1 + V_1) \approx m P^2 / 2 \lambda \quad (3)$$

and $$L \approx n[(u_2 + V_2) \sin\theta_2 - (u_1 + V_1) \sin\theta_1] \quad (4)$$

where m and n are integers, $u_1$ and $u_2$ are lengths of light paths of the rays between the diffusive light source and the first grating, $V_1$ and $V_2$ are lengths of light paths of the rays between the first and second gratings, L is a center interval between the rays on the second grating, and $\theta_1$ and $\theta_2$ are angles made by a perpendicular line drawn from the diffusive light source to the gratings with the rays.

Furthermore, to achieve the first object, according to the first aspect of the present invention, in an optical encoder comprising:

a coherent collimated lighting system having an effective wave length $\lambda$, a main scale formed with a first grating of a pitch P, an index scale formed with a second grating of a pitch Q corresponding to a higher harmonic of 2n order (n is a natural number) of the first grating, and a light-receiving element for photoelectrically transducing a light emitted from the lighting system and filtered through the first and second gratings;

wherein a detection signal periodically variable in accordance with a relative displacement between the main scale and the index scale is produced, the index scale is "leaned" (i.e., inclined) toward the main scale in order to remove a component of fluctuations due to the grating gap of a geometric image of the first grating in the detection signal.

Furthermore, the pitch Q is set at $P/(2n)$ and the "leaned" value $\delta$ of the index scale is set at $mQ^2/\lambda$ (m is a natural number).

Additionally, the pitch Q is set at $P/(2n)$, the light-receiving element is divided into two separate receiving elements, and the "leaned" value $\delta$ of the index scale as measured between the centers of gravity of the divided light-receiving elements is set at $mQ^2/(2)$ (m is a natural number).

The principle of the first aspect of the present invention will hereunder be described.

If an optical grating of a pitch P is illuminated by coherent collimated rays or diffused rays, it is known according to the Fresnel diffraction theory that a geometric image having the same pitch P as the original grating and a diffractive image having the pitch of ½ of the original grating, i.e. P/2 are formed at a position spaced v (grating gap) apart from the grating. Among these, the S/N ratio of the geometric image is greatly and periodically varied by a change in the grating gap v.

Further, in general, the optical grating is formed to provide a light-dark fringe-shaped graduation, and includes higher harmonic components to a large extent when the optical grating is Fourier-analyzed. It is made clear, for example, that these higher harmonic components each have the geometric image and the diffractive image, respectively, in applicant's Japanese Patent Application No. 61-208554.

When consideration is given to the result of experiments in view of the above, as shown in FIG. 12 (solid line A), it is apparent that this PP/DC curve is a composite between an S/N ratio of a diffractive image (pitch P/2) of the original grating (pitch P) of the first grating (broken line B in FIG. 12) and an S/N ratio of a geometric image (pitch P/2) of a secondary higher harmonic (pitch P/2) of the first grating (one-dot chain line C in FIG. 12).

As apparent from FIG. 12, the S/N ratio of the geometric image (one-dot chain line C) has the dependence on the gap, and peaks G1, G2, G3, G4 ... are located at positions where the grating gap V is of $Q^2/\lambda$ multiplied by integers, and the phases are inverted at the peaks G1, G2, G3, G4 ...

Consequently, in a case of a collimated lighting system, when a "leaned" value $\delta = mQ/\lambda$ (m is a natural number), which is the cycles of fluctuations multiplied by integers, is given to the index scale 20 as shown in FIG. 13, the geometric image is integrated by a component of cycles during which the S/N ratio varies, so that the component of variations is removed. For this reason, the dependence of the S/N ratio of the detection signal on the grating gap (V) is substantially eliminated.

Furthermore, in a case where two light-receiving elements 24A and 24B are provided and a sum of outputs of these light-receiving elements is taken by an adder 28, as shown in FIG. 14, the "leaned" value $\delta$ of the index scale 20 between the centers of gravity of the distribution of the values of illuminating light to the divided light-receiving elements 24A and 24B will be $mQ^2/(2\lambda)$. This means that, in FIG. 12 for example, signals of a point R1 and the peak G1 are added to each other and sum thereof is constant.

However, when a diffusive light source such as a laser diode is used as it is, if the second gratings 22 and the light-receiving elements 24 are provided in a plurality of stages in the widthwise direction of the index scale 20 particularly for the purposes of the directional discrimination, phase division and the like, the inclination of the index scale 20 as a whole excessively increases differences in distances between the respective light-receiving elements 24, so that the values of received light become unbalanced disadvantageously. Furthermore, there remains the problem that this method cannot be applied to the reflection type encoder in which only the second grating cannot be "leaned".

In contrast thereto, in an example of the first aspect of the present invention, the index scale is not leaned, and instead the position of the light-receiving element 24 is offset to a position $Z_1$ from position $Z_0$ (where $Z_0$ is the foot of a perpendicular line drawn from a diffusive light source 30 such as a laser diode to the first grating 18 and the second grating 22) as shown in FIG. 1. In order for light-receiving element 24 to be able to simultaneously receive a component of cycles of fluctuation, the size (W) of the light-receiving element in a widthwise direction of the scales is set at a size capable of receiving two rays B1 and B2 which satisfy the relationship between the following equations:

$$[u_2 V_2/(u_2+V_2)] - u_1 V_1/(u_1+V_1) \approx mP^2/\lambda \quad (1)$$

and $$W \approx n[(u_2+V_2)\sin\theta_2 - (u_1+V_1)\sin\theta_1] \quad (2)$$

where m and n are integers (1, 2, 3, ...), P is a pitch of the first grating 18, $\lambda$ is an effective wave length of the diffusive light source 30, $u_1$ and $u_2$ are lengths of light paths of the rays B1 and B2 between the diffusive light source 30 and the first grating 18, $V_1$ and $V_2$ are lengths of light paths of the rays B1 and B2 between the first grating 18 and the second grating 22, W is a center interval between the rays B1 and B2 on the second grating 22 (=Z2−Z1 the size of the light-receiving element 24 in the widthwise direction of the scales), and $\theta_1$ and $\theta_2$ are angles made by perpendicular line drawn from the diffusing light source 30 to the gratings 18 and 22 with the rays B1 and B2.

Particularly, in the case of the reflection type encoder, $u_2 = V_2$ and $u_1 = V_1$. Therefore, when these are substituted into $u_2 = V_2 = d_2$ and $u_1 = V_1 = d_1$, the aforementioned equation (1) and (2) are represented by the following equations:

$$(d-d_1)/2 = mP^2/\lambda \quad (5)$$

$$w \approx 2n (d_2\sin\theta_2 - d_1\sin\theta_1) \quad (6)$$

A factor of a term of the dependence of the geometric image on the grating gap is $\cos[\pi\lambda uv/(P^2(u+v))]$. Consequently, when it is determined that the relationship between the optical distances $u_1$, $u_2$ and $V_1$, $v_2$ of the two rays B1 and B2 from the diffusive light source 30 satisfies the afore-mentioned equations (1), (2) or (5), (6), the components of cycles of fluctuations are simultaneously received, so that the geometric image can be substantially offset.

Accordingly, necessity of "leaning" the index scale is eliminated. Even when the diffusive light course is used or the reflection type encoder is used, the dependence of the S/N ratio of the detection signal on the grating gap can be decreased.

Additionally of importance in the above-described example of the first aspect of the present invention is that the light-receiving element 24 receives the two rays B1 and B2 which satisfy the afore-mentioned equations (1) and (2). If this condition is satisfied, then the position of the light-receiving element 24 need not necessarily be offset from the position $Z_0$ to $Z_1$ and the light-receiving element may be provided at a position including the position $Z_0$ at the foot of the perpendicular line. Furthermore, one of the rays (e.g., B1) may coincide with the perpendicular line. Moreover, when the position of the light-receiving element 24 is completely offset from the position $Z_0$ foot of the perpendicular line as shown in FIG. 1, another set comprising a second grating 22 and a light-receiving element 24 which have substantially the same light-receiving signal level can be provided at a symmetrical position (as will be shown in a first embodiment to be described hereunder), so that two sets of second gratings 22 which differ in phase from each other can be easily provided for the purposes of directional discrimination, phase division and the like.

Furthermore, the light-receiving element 24 need not necessarily have the size in which the rays B1 and B2 are simultaneously received by a single light-receiving element 24. For example, as shown in FIG. 2, a single detection signal is formed such that two light-receiving elements (24A and 24B) are provided with a predetermined center interval (L), and thereafter, a sum therebetween is used to obtain a detection signal. The respective light-receiving elements receive two rays $C_1$ and $C_2$ which are half cycle different in grating gap dependence from each other and satisfy the relationship between the following equations:

$$u_2 V_2/(u_2+V_2) - u_1 V_1/(u_1+V_1) \approx mP^2/2\lambda \quad (3)$$

and $$L n [(u_2+V_2)\sin\theta_2 - (u_1+V_1)\sin\theta_1] \quad (4)$$

where L is a center interval between the rays $C_1$ and $C_2$ on the second grating 22 (the center interval between the light-receiving elements 24A and 24B), and other symbols are substantially the same as in the case of the equations (1) and (2).

Particularly, in the case of the reflection type encoder, similarly to the preceding case, the afore-mentioned equations (3) and (4) are represented by the following equations:

$$d_2 - d_2 = mP^2/\lambda \quad (7)$$

$$L \approx 2n (d_2\sin\theta_2 - d_1\sin\theta_1) \quad (8)$$

Accordingly, in the above-described cases, the sum between the outputs from the respective light-receiving elements 24A and 24B which are a half cycle different from each other is made to be a detection signal, so that the geometric image may be substantially offset.

As has been described hereinabove, according to the first aspect of the present invention, not only in the use of the collimated lighting, but also in the use of the diffused rays and of the reflection type encoder, the signal due to the geometric image in the detection signal can be removed, so that the dependence of the S/N ratio of the detection signal on the grating gap can be substantially avoided. Thus offering the outstanding advantages that the positioning accuracy becomes less severe, the detector can be reduced in cost, and so forth.

To achieve the second object, according to a second aspect of the present invention, in a reflection type encoder comprising:

a lighting system, a main scale formed with a periodical first grating, a light transmitting index scale formed with corresponding periodical second gratings, and a light-receiving element for photoelectrically transducing a light emitted from the lighting system, reflected by the first grating and transmitted through the second grating, wherein a periodical detection signal is produced in accordance with a relative displacement between the both scales, the lighting system includes a point light source and a condensing lens for focusing diffused rays from the point light source to form a secondary point light source, whereby the secondary point light source is formed in the plane where the second grating of the index scale is formed.

More specifically, according to the second aspect or the present invention, when the reflection type encoder is used in which the point light source is used as it is and the lighting rays are not collimated, the diffused rays from the primary point light source are focused by the condensing lens to produce a secondary point light source, and the secondary point light source is adapted to be positioned in the plane where the second grating of the index scale is formed.

Consequently, a condensing lens smaller in diameter than a collimator lens is used in the reflection type encoder, so that the encoder can be reduced in shape not only in thickness but also in a direction parallel to a plane where the graduation of the main scale is formed. Furthermore, the necessity of obliquely supporting the point light source and the like is eliminated, and it becomes easy to support and position the respective elements.

Furthermore, when a columnar distributed refractive index type lens is adopted as the condensing lens, the condensing lens can be formed particularly small, thus enabling the encoder to be compact in size.

When the second gratings are divided into four sections that are 90° different in phase from one another and the secondary point light source is formed at the center of the second gratings of the four sections, the second gratings of the four sections can be illuminated substantially uniformly, and moreover, the encoder can be made compact in size.

Furthermore, when the secondary point light source is positioned at an opening on the plane where the second gratings are formed, no excessive diffused rays are illuminated on the gratings, so that the detection signal having a satisfactory S/N ratio can be obtained.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

Embodiments of the reflection type encoder, to which is applied the present invention will hereunder be described in detail with reference to the accompanying drawings.

Figure 1:
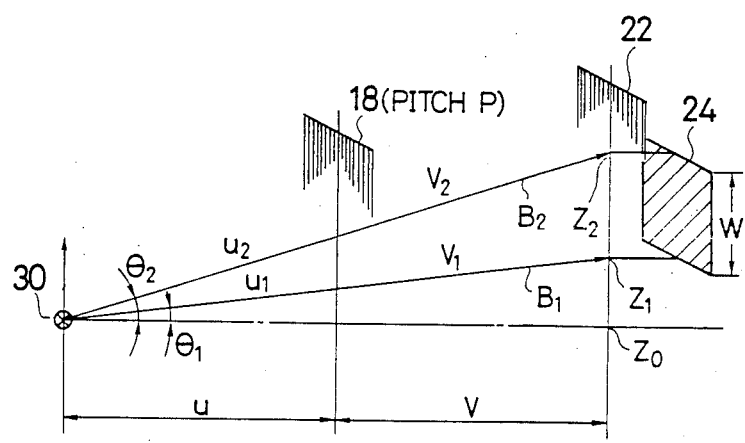
FIGS. 1 and 2 are charts in explanation of the principle of the first aspect of the present invention.
Figure 3:
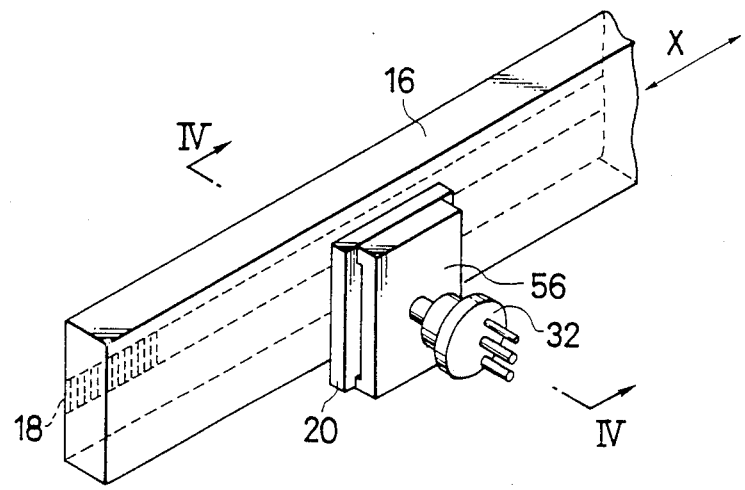
FIG. 3 is a perspective view showing the general arrangement of a first embodiment of the present invention.
Figure 4:
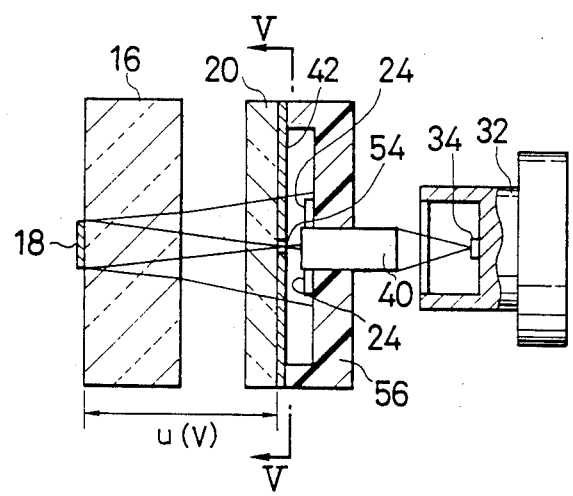
FIG. 4 is a cross-sectional view taken along the line IV—IV FIG. 3.
Figure 5:
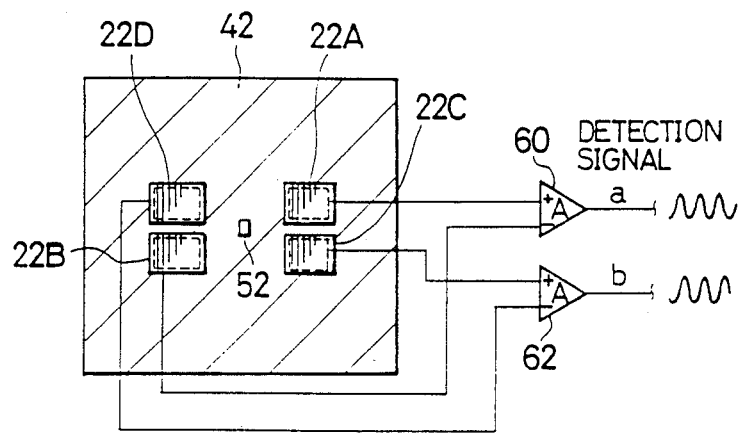
FIG. 5 is a cross-sectional view taken along the line V—V in FIG. 4.

According to the first embodiment of the present invention, as shown in FIGS. 3 to 5, in a reflection type linear encoder comprising:

a diffusive light source 30 including an LD tip 34 (Refer to FIG. 4) received in a container 32;

a main scale 16 formed with a first grating 18 of a pitch P;

a light transmitting index scale 20 formed with corresponding four second gratings 22A, 22B, 22C, 22D (Refer to FIG. 5); and four light-receiving elements 24 (Refer to FIG. 4) for photoelectrically transducing a light emitted from the diffusive light source 30, reflected by the first grating 18 and transmitted through the respective second gratings 22A to 22D; wherein two detection signals a and b are produced in accordance with a relative displacement between the main scale 16 and the index scale 20, the size of each of the light-receiving elements 24 in the widthwise direction of the scales is set at a size, within which two rays B1 and B2 (Refer to FIG. 1) having center interval W and satisfying the relationship between the aforementioned equations (5) and (6) can be received at the positions of the respective second gratings 22A to 22D.

As shown in FIG. 4 in detail, the diffusive light source 30 includes: the LD tip 34 as being the primary point light source; and a columnar distributed refractive index type lens 40 as being a condensing lens for focusing the diffused ray from the LD tip 34 to form a secondary point light source. Further, the secondary point light source is formed at a position in a plane (chromium-deposited surfaces) 42 where the second grating 22A to 22D in the index scale 20 is formed.

The main scale 16 is made of a glass plate, and, as shown in FIG. 3, is formed at one surface (outer surface) thereof with the first grating 18 formed of a fringe-shaped periodical graduation of a pitch P.

As shown in FIG. 5 in detail, in the index scale 20, the second gratings 22A, 22B, 22C and 22D having pitches equal to one another and formed into four sections corresponding in phase to 0°, 180°, 90° and 270°, and a central opening 52 at which the secondary light source is positioned and the light is passed therethrough are formed in the chromium-deposited surface 42.

The central opening 52 has a height of 0.4 mm and a width of 0.1 mm for example. Focused in this central opening 52 by distributed refractive index type lens 40 (e.g. Selfoclens (trade mark), a product of Nippon Sheet Glass Co., Ltd.) are the diffused rays from the LD tip 34, whereby a secondary point light source 54 is formed (Refer to FIG. 4).

As shown in FIG. 4, the four light-receiving elements 24 corresponding to the second gratings 22A to 22D, respectively, are arranged on a light-receiving board 56. The second gratings 22A to 22D are in a positional relationship indicated by broken lines in FIG. 5, whereby the respective two second gratings constitute each of pairs, and detection signals a and b are produced therefrom by differential amplifiers 60 and 62.

The distributed refractive index type lens 40 is also inserted into the center of the light-receiving board 56.

For example, when the grating pitch P=8 μm, the wave length of the light source $\lambda \approx 0.8$ m, m=n=1, u=V=d=5 mm, and $\theta_1 = 8°$, in this first embodiment, d1, d2 and $\theta_2$ in the afore-mentioned equations (5) and (6) become as shown below:

$$d1 = d/\cos\theta \approx 5.049 \text{ mm}$$

$$d2 = 2P^2/\lambda + d1 \approx 5.209 \text{ mm}$$

$$\theta_2 = 16.3° \text{ because } \cos\theta \approx 5/5.209$$

When these are substituted into the equation (6), $W \approx 1.581 \approx 1.5$ mm. Consequently, if the size of each of the light-receiving elements 24 in the widthwise direction of the scales is set at a size within which the two rays B1 and B2 that have the centerinterval $W \approx 1.5$ mm can be received or at a size multiplied by integers at the positions of the respective second gratings 22A to 22D, then the geometric image can be substantially offset.

In this embodiment, necessity of increasing the number of the light-receiving elements can be eliminated, so that the encoder can be simplified in construction.

Furthermore, in this embodiment, the secondary point light source 54 is formed by use of the distributed refractive index type lens 40, so that the substantially ideal diffused rays can be obtained. Incidentally, the method of forming the diffusive light source 30 need not be limited to this, and a laser diode may be directly adopted as the diffusive light source, or a tungsten lamp and a light-emitting diode other than the laser diode can be used.

The second embodiment of the present invention will hereunder be described in detail.

Figure 2:
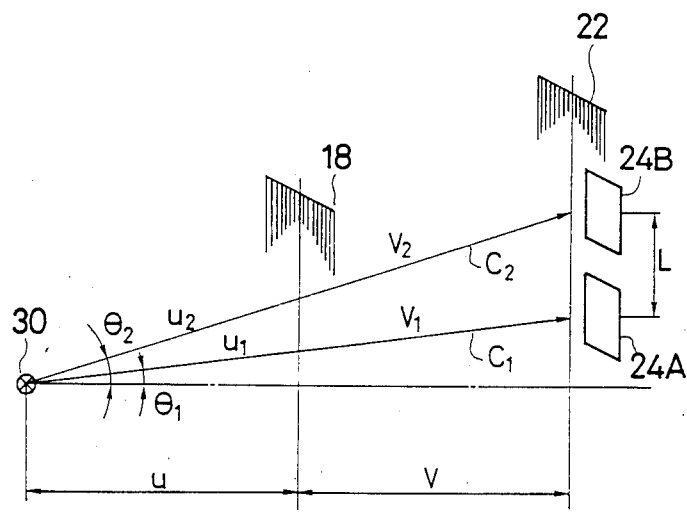
Figure 6:
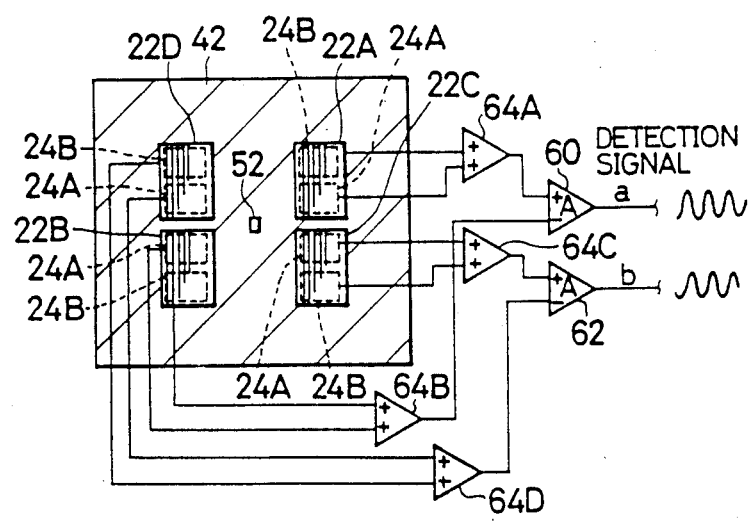
FIG. 6 is a sectional view showing the general arrangement of a third embodiment of the present invention.
Figure 6:
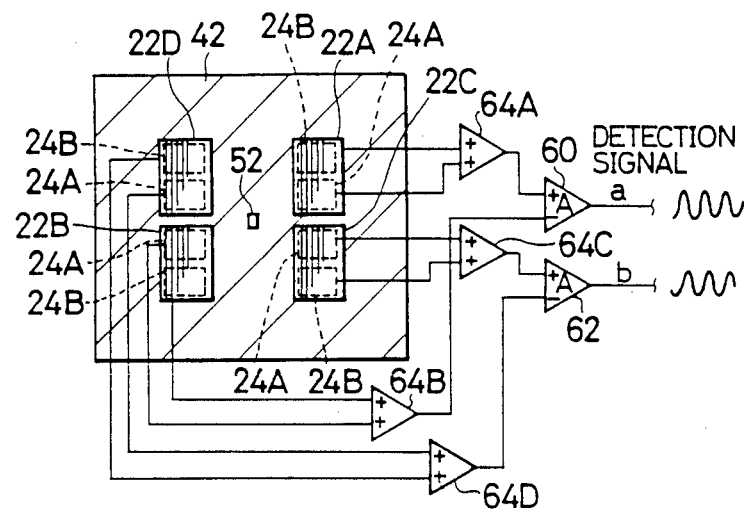

According to this second embodiment, in the reflection type encoder similar to the one in the first embodiment, as shown in FIG. 6, two light-receiving elements 24 (24A and 24B) corresponding to the respective second gratings 22A and 22D are provided, the center interval of the respective light-receiving elements 24A and 24B in the widthwise direction of the scale is set at a size corresponding to the interval L in the equation (8) so that the two rays C1 and C2 (Refer to FIG. 2) satisfying the relationship between the afore-mentioned equations (7) and (8) can be received at the position of the corresponding second gratings 22A to 22D, further, the sums of outputs from the respective light-receiving elements 24A and 24B are obtained by means of adders 64A to 64D, the results are differentially amplified by means of the differential amplifiers 60 and 62 which are similar to the ones shown in the first embodiment, and two detection signals a and b for making directional discrimination, phase division, etc. are obtained.

In this second embodiment, for example, if the grating pitch P=8 μm, the wave length of the light source $\lambda \approx 0.8$ μm, m=n=1, u=V=d=5 mm, and $\theta_1 = 8°$, then d1, d2 and $\theta_2$ of the equations (7) and (8) become as shown below.

$$d1 \approx 5.049 \text{ mm}$$

$$d2 \approx 5.129 \text{ mm}$$

$$\theta_2 \approx 12.9°$$

when these are substituted into the equation (8), L≈0.884≈0.9 mm. Therefore, if the center interval between the respective light-receiving elements 24A and 24B in the widthwise direction of the scale are about 0.9 mm or 0.9 mm multiplied by integers at the positions of the second gratings 22A to 22D, then the geometric image can be substantially offset by taking the sum of the outputs.

The third embodiment of the present invention will hereunder be described in detail.

Figure 7:
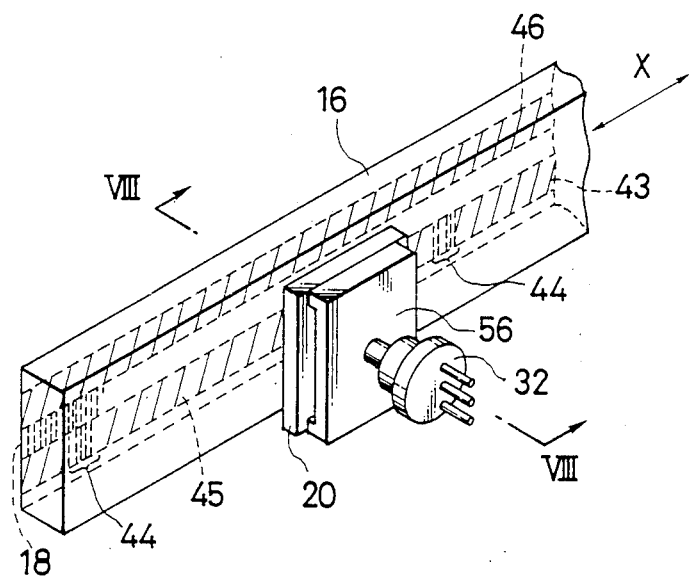
FIG. 7 is a perspective view showing the general arrangement of a third embodiment of the present invention.

As shown in FIG. 7, the main scale 16 of the third embodiment is formed with: the first grating 18 similar to the one shown in the first embodiment, a track 43 for first absolute zero point (ABS) marks, including the first ABS marks 44 made of a random pattern and a chromium-deposited section 45 formed therebetween, and a chromium-deposited surface 46 for producing a reference signal of an ABS signal.

Figure 9:
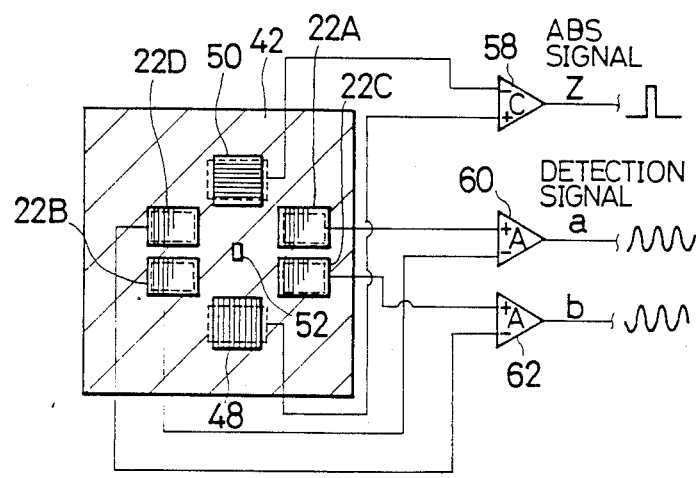
FIG. 9 is a cross-sectional view taken along the line IX—IX in FIG. 8.

Furthermore, as shown in FIG. 9 in detail, the index scale 18 of the third embodiment is formed with: the second gratings 22A, 22B, 22C and 22D, and the opening 52 similar to those shown in the first embodiment, a second ABS mark 48 made of a pattern obtained by doubling the first ABS marks 44, and a reference ABS mark 50 being in fringed shape in a direction perpendicular to the second gratings 20A to 20D so that the value of the transmitted light is decreased to be balanced with the value of light transmitted through the ABS marks 44 and 48.

Figure 8:
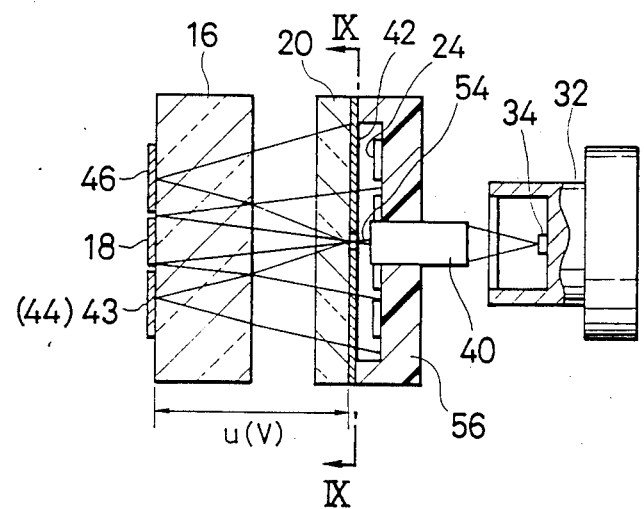
FIG. 8 is a cross-sectional view taken along the line VIII—VIII in FIG. 7.

As shown in FIG. 8, 6 light-receiving elements 24 corresponding to the four second gratings 22A to 22D, the second ABS mark 48 and the reference ABS mark 50, respectively, are provided on the light-receiving board 56 in a positional relationship indicated by broken lines in FIG. 9, with two light-receiving elements 24 constituting a pair, respectively. A signal produced by the second ABS mark 48 is compared with a signal produced by the reference ABS mark 50 in a comparator 58 to be turned into the ABS signal Z, and signals produced by the second gratings 22A to 22D are turned into the two detection signals a and b by means of the differential amplifiers 60 and 62.

Here, the gap (V) between the plane where the first grating 18 is formed and the plane where the second grating is formed (chromium-deposited surface 42) coincides with the gap u between the secondary point light source 54 and the plane where the first grating 18 is formed. In the experiments, when u (V) =6 mm, P=8 μm and Q=8 μm, pitches of the detection signals a and b were 4 μm and the S/N ratio was satisfactory.

The distributed refractive index type lens 40 is adopted as the condensing lens in this embodiment, so that the detector can be rendered compact in size in particular. Incidentally, the construction of the condensing lens need not be limited to this, and an ordinary glass lens may be adopted. Incidentally, when the condensing lens is used in this way, the encoder is considered as becoming large-sized in the thickness-wise direction at a glance. However, the condensing lens can be small-sized, so that even this arrangement can be smaller in size than the case where the collimated rays are obtained by means of the conventional collimator lens.

Since the secondary point light source 54 is provided at the central position of the four sections of the second gratings 22A to 22D in this embodiment, the respective second gratings can be illuminated substantially uniformly, and moreover, the encoder can be rendered compact in size. Incidentally, the number of sections of the second gratings and the position where the secondary point light source 54 is formed need not be limited to this.

Further, since the secondary point light source 54 is focused at the small source opening 52 on the plane where the second grating is formed in this embodiment, no excessive diffused rays are illuminated on the grating 18 and the detection signals a and b having the satisfactory S/N ratios can be obtained. Incidentally, the shape and size of the opening 52 for transmitting therethrough the illuminating rays need not be limited to this.

Furthermore, since the main scale 16 is made of glass and the first grating 18 and the like are formed on the outer surface of the main scale 16 in this embodiment, the encoder can be rendered compact in size by a value of thickness of the main scale 16. Moreover, the arrangement of the main scale need not be limited to this, and a metallic reflection type scale may be adopted.

Further, since the ABS marks 44 and 48 are combinedly used to obtain the ABS signal Z in this embodiment, correction may be made through the detection of an absolute zero point. Incidentally, the arrangement for obtaining the ABS signal Z such as the ABS marks may be dispensed with.

The fourth embodiment of the present invention will hereunder be described in detail.

Figure 10:
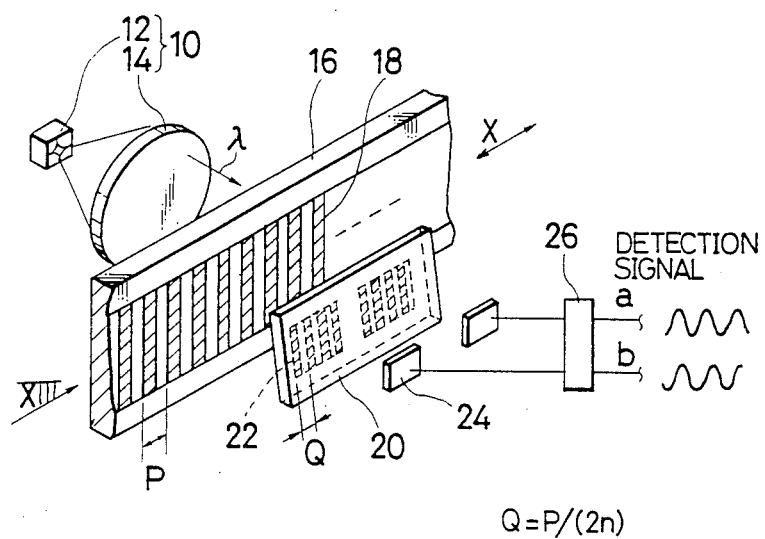
FIG. 10 is a perspective view showing the general arrangement of a fourth embodiment of the present invention.
Figure 11:
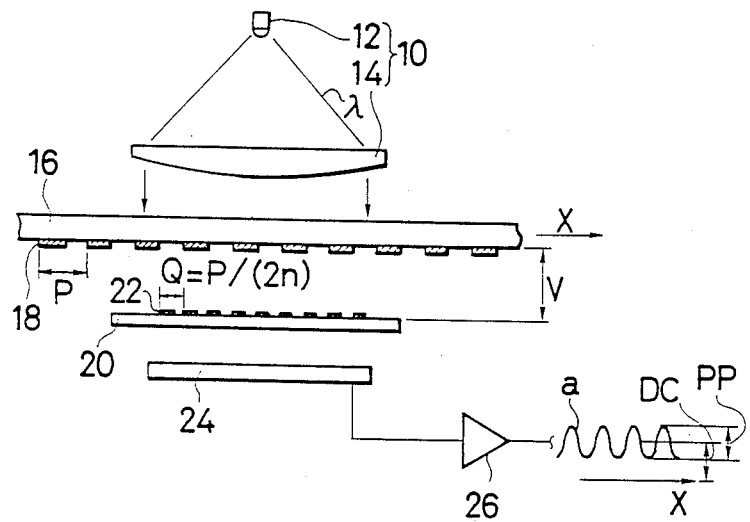
FIG. 11 is a plan view showing an arrangement of related art proposed by the present applicant in Japanese Patent Application NO. 81-191532.

As shown in FIG. 10, according to this fourth embodiment, in an optical encoder comprising:

a coherent collimated lighting system 10 having an effective wave length λ, including an LED 12 and a collimator lens 14, a main scale 16 formed with a first grating 18 of a pitch P, an index scale 20 formed with two second gratings 22 of a pitch Q corresponding to the higher harmonic of 2n order (n is a natural number) of the first grating 18, with said two second gratings being shifted by 90° in phase from each other, light-receiving elements 24 for photoelectrically transducing rays emitted from the collimated lighting system 10 and filtered through the first and second gratings 18 and 22, and a preamplifier 26 for amplifying outputs from the light-receiving elements 24, respectively, to obtain the detection signal a and b shifted by 90° in phase from each other.

Figure 13:
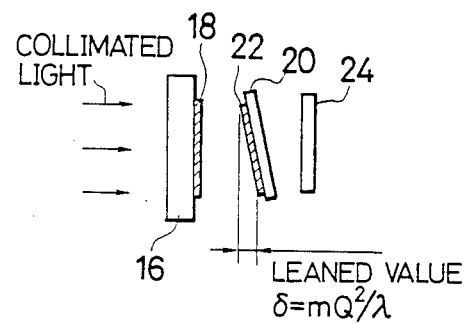
FIG. 13 is a sectional view in the direction indicated by the arrows XIII in FIG. 10, showing the theoretical arrangement of one example of the first aspect of the present invention.

As shown in FIG. 13 in detail, the index scale 20 is leaned to the main scale 16 by a "leaned" value $\delta = mQ^2/\lambda$ (m is a natural number) so that a component of fluctuations in the detection signals a and b due to the grating gap (V) of the geometric image of the first grating 18 can be removed.

As the light source of the collimated lighting system 10, a laser diode is ideal. However, a tungsten lamp or the LED 12 used in the embodiment may be adopted.

Now, when the pitch P of the first grating 18 is set at 20 μm, the pitch Q of the second gratings 22 may be set at 10 m (m=1) or 5 μm (m=2) (for example).

Figure 12:
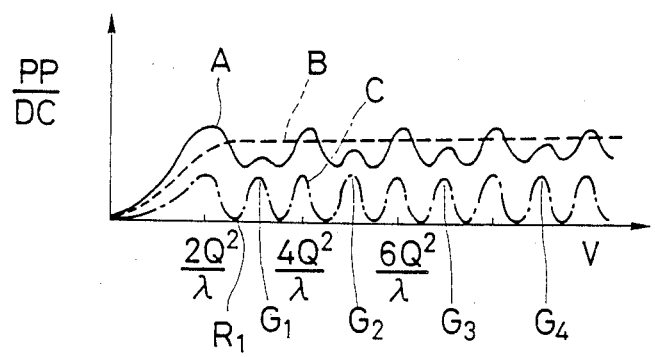
FIG. 12 is a chart showing the dependence of the S/N ratio of the detection signal on the grating gap in the aforementioned related art.

Since a component of fluctuations due to a geometric image indicated by a one-dot chain line C in FIG. 12 is removed from a component of fluctuations due to the grating gap (V) of the detection signals, as indicated by a solid line A (in this fourth embodiment), detection signals can be obtained which are indicated by a broken line B and have a high S/N ratio due to the diffractive image, which is substantially constant irrespective of the grating gap.

The fifth embodiment will hereunder be described in detail.

Figure 14:
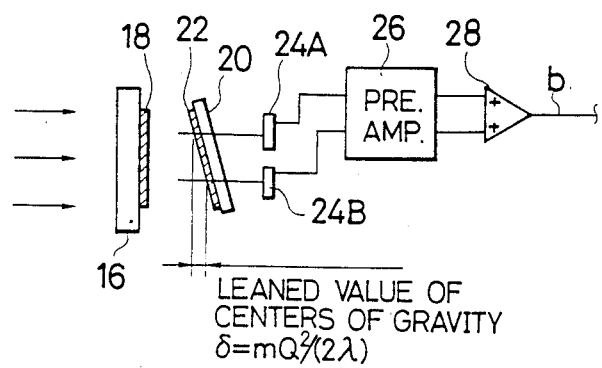
FIG. 14 is a sectional view showing the theoretical arrangement of another example of the first aspect of the present invention.
Figure 15:
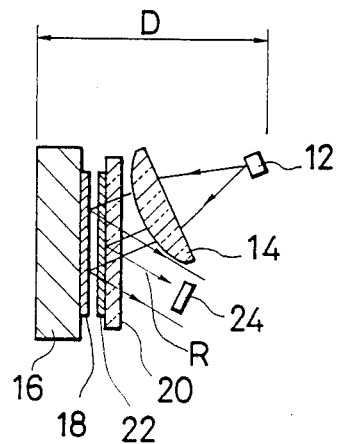
FIG. 15 is a sectional view showing the arrangement of an example of the reflection type encoder using conventional collimated light rays.
Figure 16:
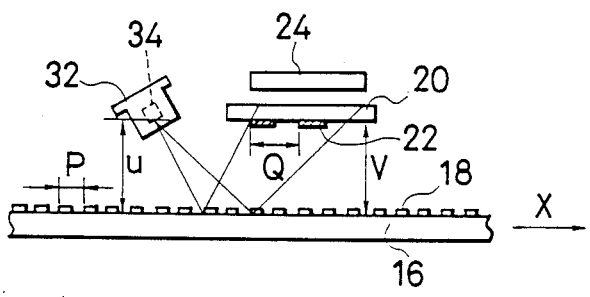
FIG. 16 is a sectional view showing the arrangement of an example of the reflection type encoder using the diffusive light source as it is, which has been proposed by the present applicant in Japanese Patent Application No. 61-194183.

As has shown in FIG. 14, in this fifth embodiment, the light-receiving element is vertically divided into two elements 24A and 24B and one of the detection signals, e.g. the detection signal b is obtained after the addition is performed in the adder 28. The other a of the detection signals is similarly obtained as a sum signal of the two light-receiving elements.

In this fifth embodiment, a "leaned" value between the centers of gravity of distribution of the value of illuminating light to the light-receiving elements 24A and 24B of the index scale 20 is set at $mQ^2/(2\lambda)$.

Other respects of the arrangement and action are similar to those shown in the fourth embodiment, so that description will be omitted.

In all of the above embodiments, the present invention has been applied to the encoders including types with the scales made of glass, however, the scope of application of the present invention can be applied to an encoder including a metallic scale and to a rotary encoder.

What is claimed is:

1. An optical encoder comprising:
    a coherent collimated lighting system having an effective wave length $\lambda$;
    a main scale formed with a first grating having a pitch P;
    an index scale spaced from the main scale by a grating gap and formed with a second grating having a pitch corresponding to a higher harmonic of 2n order of the first grating, wherein n is a natural number; and
    a light receiving element for photoelectrically transducing light emitted from said lighting system and propagated through the first and second gratings so as to produce a detection signal periodically variable in accordance with a relative displacement between the main scale and the index scale;
    the index scale being inclined toward the main scale relative to a plane normal to the direction of propagation of light emitted from said lighting system in order to remove a component of fluctuations due to the grating gap from a geometric image of the first grating in the detection signal.

2. The optical encoder as set forth in claim 1, wherein the pitch Q has a value $P/(2n)$, the first and second gratings each comprise a plurality of spaced grating elements having a longitudinal axis oriented relatively normal to the direction of propagation of light emitted by said lighting system, and the index scale is inclined such that the projection, on a plane parallel to the direction of propagation of light emitted by said lighting system, of two predetermined spaced locations on the longitudinal axis of a grating element of the second grating has a length of $mQ^2/\lambda$, where m is a natural number.

3. The optical encoder as set forth in claim 1, wherein the pitch Q has a value $P/(2n)$, the first and second gratings each comprise a plurality of spaced grating elements having a longitudinal axis oriented relatively normal to the direction of propagation of light emitted by said lighting system, the light receiving element comprises first and second receivers spaced from each other so as to define respective centers of gravity which are spaced from each other relative to the longitudinal axis of a grating element of the second grating, and the index scale is inclined such that the projection, on a plane parallel to the direction of propagation of light emitted by said lighting system of first and second spaced locations on the longitudinal axis of a grating element of the second grating respectively defined by first and second planes extending parallel to the direction of propagation of light emitted by said lighting system and respectively passing through the centers of gravity of said first and second receivers, has a length of $mQ^2/(2\lambda)$, where m is a natural number.

* * * * *